United States Patent [19]
Fenton

[11] Patent Number: 5,997,427
[45] Date of Patent: Dec. 7, 1999

[54] CONTINUOUSLY VARIABLE GEARING TRANSMISSION

[76] Inventor: John W. Fenton, 26 Shoreland Dr., Key Largo, Fla. 33037

[21] Appl. No.: 09/149,699

[22] Filed: Sep. 8, 1998

[51] Int. Cl.$^6$ ............................. F16H 1/32; F16H 3/70; F16H 29/04
[52] U.S. Cl. ............................. 475/162; 475/170; 74/117
[58] Field of Search ..................... 74/116, 117; 475/162, 475/169, 170

[56] References Cited

U.S. PATENT DOCUMENTS

| | | | |
|---|---|---|---|
| 1,701,823 | 2/1929 | Rhodes . | |
| 3,442,158 | 5/1969 | Marcus | 475/170 |
| 3,803,931 | 4/1974 | Bianchini et al. | 74/117 |
| 4,497,221 | 2/1985 | Koser . | |
| 5,099,706 | 3/1992 | Irvin . | |
| 5,108,352 | 4/1992 | Pires . | |
| 5,582,556 | 12/1996 | Phung | 74/117 X |
| 5,674,144 | 10/1997 | Wiley | 475/170 |
| 5,685,794 | 11/1997 | Willmot | 475/170 |
| 5,797,822 | 8/1998 | Green | 475/306 |

FOREIGN PATENT DOCUMENTS

| | | |
|---|---|---|
| 1251574 | 3/1960 | France . |
| 3532736 | 4/1987 | Germany . |

*Primary Examiner*—Charles A Marmor
*Assistant Examiner*—Roger Pang
*Attorney, Agent, or Firm*—Frank L. Kubler

[57] ABSTRACT

A transmission apparatus includes an input shaft; an output shaft; a ring gear having internal ring gear teeth and having a ring gear central axis; a ring gear constraining structure constraining the ring gear to move translationally along a substantially circular path about the input shaft rotational axis without rotating about its own central axis relative to the apparatus; a mechanism for continuously changing the distance between the ring gear central axis and the input shaft rotational axis; a pinion gear having a diameter smaller than the inner diameter of the ring gear and retained with the ring gear so that its rotational axis is parallel with the ring gear central axis; and held in engagement with the ring gear teeth by a pinion gear constraining structure rotationally connected to an apparatus output shaft; where each time the input shaft rotates one revolution, the ring gear constraint structure moves the ring gear one revolution translationally along the circular path around the input shaft rotational axis, and the distance between the input shaft rotational axis and the ring gear central axis defines the diameter of the circular path over which the pinion gear travels during a single input shaft revolution, and thus defines the distance over which the pinion gear rolls for each revolution.

7 Claims, 6 Drawing Sheets

CONTINUOUSLY VARIABLE GEARING TRANSMISSION

BACKGROUND OF THE INVENTION

1. Field of the Invention

The present invention relates generally to the field of mechanisms for transmitting rotational energy and torque from one mechanical element to another. More specifically the present invention relates to a transmission apparatus for transmitting rotational energy from an input shaft to an output shaft at gear ratios, or in more general terms at rotational ratios, which are variable between a maximum forward ratio and a maximum rearward ratio continuously at any of an infinite number of intermediate ratios.

The apparatus includes a ring gear having internal ring gear teeth and having a central axis. The ring gear is constrained with ring gear constraining means to move translationally along a lateral circular path about an input shaft rotational axis, without rotating about its own central axis relative to the apparatus; means for continuously changing the distance between the ring gear central axis and the input shaft rotational axis; a pinion gear having a diameter smaller than the inner diameter of the ring gear and retained with the ring gear such that its rotational axis is parallel with the ring gear central axis and held in engagement with the ring gear teeth by pinion gear constraining means connected to an apparatus output shaft by gear train means to transmit torque and rotational movement to the output shaft.

2. Description of the Prior Art

There have long been transmissions for transmitting torque from an input shaft to an output shaft and for altering the number of revolutions made by the output shaft for every revolution of the input shaft. Examples of these prior transmissions are found in automobiles and plant machinery. A problem with them is that most alter the rotational ratios incrementally, by disengaging the input shaft momentarily to permit shifting a new gear into the chain. This shifting causes discontinuous acceleration and requires either complex and expensive automatic shifting mechanisms or human monitoring and control. Furthermore, the clutches wear out much faster than the transmission as a whole, making frequent shut-downs and servicing necessary.

Continuously variable transmissions have been constructed, but with decided disadvantages. An example is a rotating disk having a radially mounted engaging wheel which slides along the disk to varying radial points for different disk/wheel rotational ratios. This transmission is used in some lawn mowers, and has proven inefficient and subject to frequent failure. Others have involved complicated fluid pump braking systems, and can be heavier, bulkier and more expensive to manufacture than conventional, shifting transmissions.

Prior art references for transmissions generally which are known to the applicant include: German U.S. Pat. No. 3,532,736, having an output on sliding blocks; Irvin, U.S. Pat. No. 5,099,706, having a rack and pinion drive transmission; France U.S. Pat. No. 1,251,574, having an eccentric planetary drive; Koser U.S. Pat. No. 4,497,221, varying the radius of the chain ring so as to vary the ratio; Pires U.S. Pat. No. 5,108,352, having an eccentric planetary transmission with a counterbalance means and sliding blocks; and Rhodes U.S. Pat. No. 1,701,823, having a CVT using centrifugal force to change ratio, and having a rotating ring gear.

It is thus an object of the present invention to provide a transmission which provides clutch-free, continuously variable transmission of torque.

It is another object of the present invention to provide such a transmission which is simple in design, having only a few operating parts, and is reliable and inexpensive to build.

It is still another object of the present invention to provide such a transmission which can be serviced easily and by minimally skilled personnel.

It is finally an object of the present invention to provide such a transmission which occupies less space than most automatic transmissions in use today.

SUMMARY OF THE INVENTION

The present invention accomplishes the above-stated objectives, as well as others, as may be determined by a fair reading and interpretation of the entire specification.

A transmission apparatus is provided, including an input shaft; an output shaft; a ring gear having internal ring gear teeth and having a ring gear central axis; a ring gear constraining structure constraining the ring gear to move translationally along a substantially circular path about the input shaft rotational axis without rotating about its own central axis relative to the apparatus; a mechanism for continuously changing the distance between the ring gear central axis and the input shaft rotational axis; a pinion gear having a diameter smaller than the inner diameter of the ring gear and retained with the ring gear so that its rotational axis is parallel with the ring gear central axis; and held in engagement with the ring gear teeth by a pinion gear constraining structure rotationally connected to an apparatus output shaft; where each time the input shaft rotates one revolution, the ring gear constraint structure moves the ring gear one revolution translationally along the circular path around the input shaft rotational axis, and the distance between the input shaft rotational axis and the ring gear central axis defines the diameter of the circular path over which the pinion gear travels during a single input shaft revolution, and thus defines the distance over which the pinion gear rolls for each revolution.

The apparatus preferably additionally includes an outer housing containing a gear lubricant. The ring gear constraining structure preferably includes an annular frame having an inner diameter larger than the ring gear outer diameter and containing the ring gear, the annular frame being fixed within the housing against rotation relative to the housing and having a plurality of radially opening pivot leg slots; several pivot legs, each pivot leg extending through and pivotally mounted within of the pivot leg slots and extending to and being pivotally secured to the outer surface of the ring gear; where the pivot legs permit the ring gear to move translationally around the center of the annular frame along a substantially circular path and prevent rotation of the ring gear about the central axis of the ring gear.

The input shaft preferably flares radially outward within the housing into an input shaft flange having a thick region at its circumference forming an input shaft flange rim. The mechanism for continuously changing the distance between the ring gear central axis and the input shaft rotational axis preferably includes a ring gear containment ring fit closely and slidingly around the ring gear; at least one male worm gear extending radially outward from the containment ring into a corresponding bore in the input shaft flange rim; at least one female worm gear engagingly containing the at least one male worm gear; a mechanism for rotating the female worm gear relative to the male worm gear; thereby translationally moving the containment ring and the ring gear along a diametric path within the annular frame and continuously altering the distance between the input shaft rotational axis and the output shaft rotational axis to vary the rotation ratio.

The pinion gear constraining structure preferably includes a raceway within the ring gear; and a bearing riding within the smooth ring gear segment, the pinion gear being mounted off-center to the bearing so that teeth of the pinion gear mesh with teeth of the ring gear.

The apparatus preferably additionally includes a gear train for rotationally and drivably connecting the pinion gear to the output shaft, the gear train including a pinion gear shaft extending coaxially from the pinion gear; a larger diameter first gear formed onto the pinion gear shaft; a smaller diameter last gear formed onto the output shaft; and at least one intervening double tiered gear drivably connecting the first gear and the last gear, the at least one double tiered gear including a gear shaft having a small gear at one gear shaft end and a larger gear at the other gear shaft end, the gear shaft; where the gear train is capable of pivoting around itself to at each pair of intermeshing gears so that the input axis and rotational output axis can be extended away from each other and toward each other while remaining mutually parallel.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
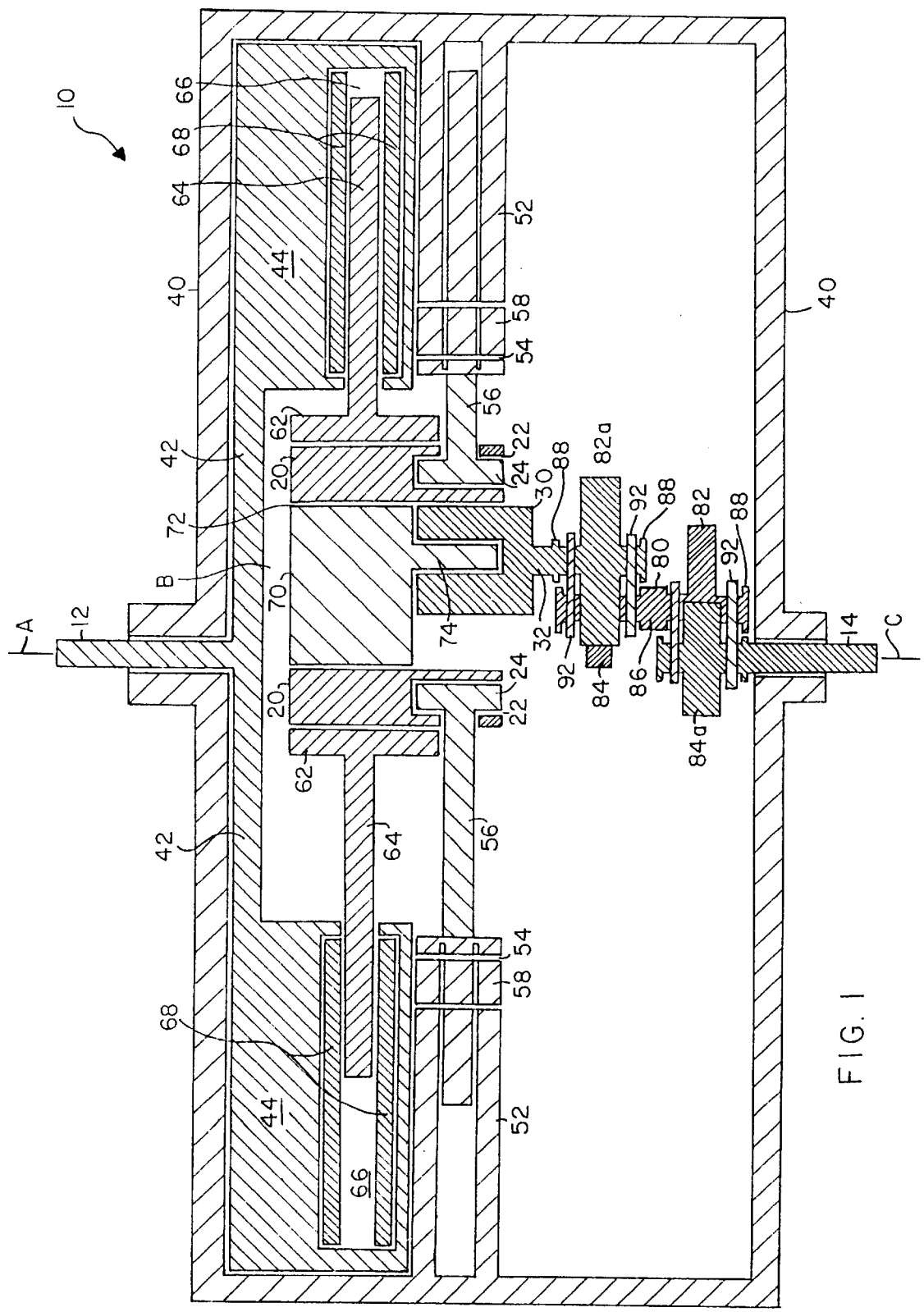
FIG. 1 is a cross-sectional top view of the entire transmission apparatus showing the interrelation of the various mechanical elements.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

First Preferred Embodiment

Figure 2:
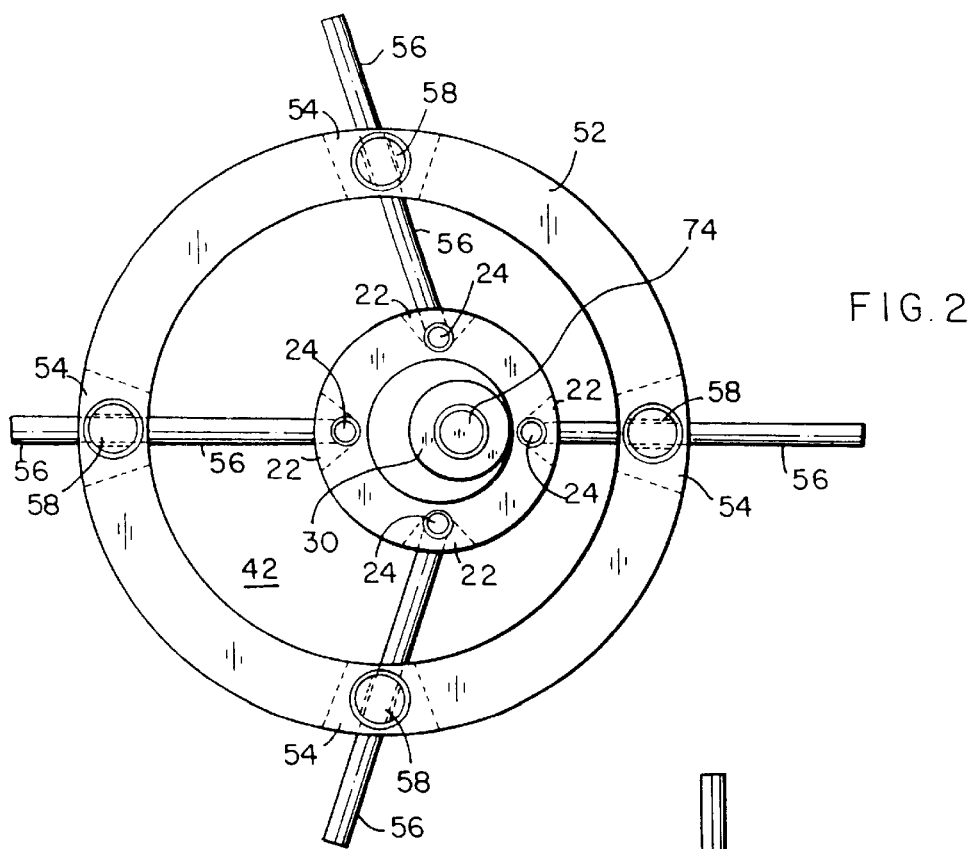
FIG. 2 is a partial cross-sectional front view of the apparatus of FIG. 1 taken along line C–D, showing the ring gear at a three o'clock position along its circular locus.
Figure 3:
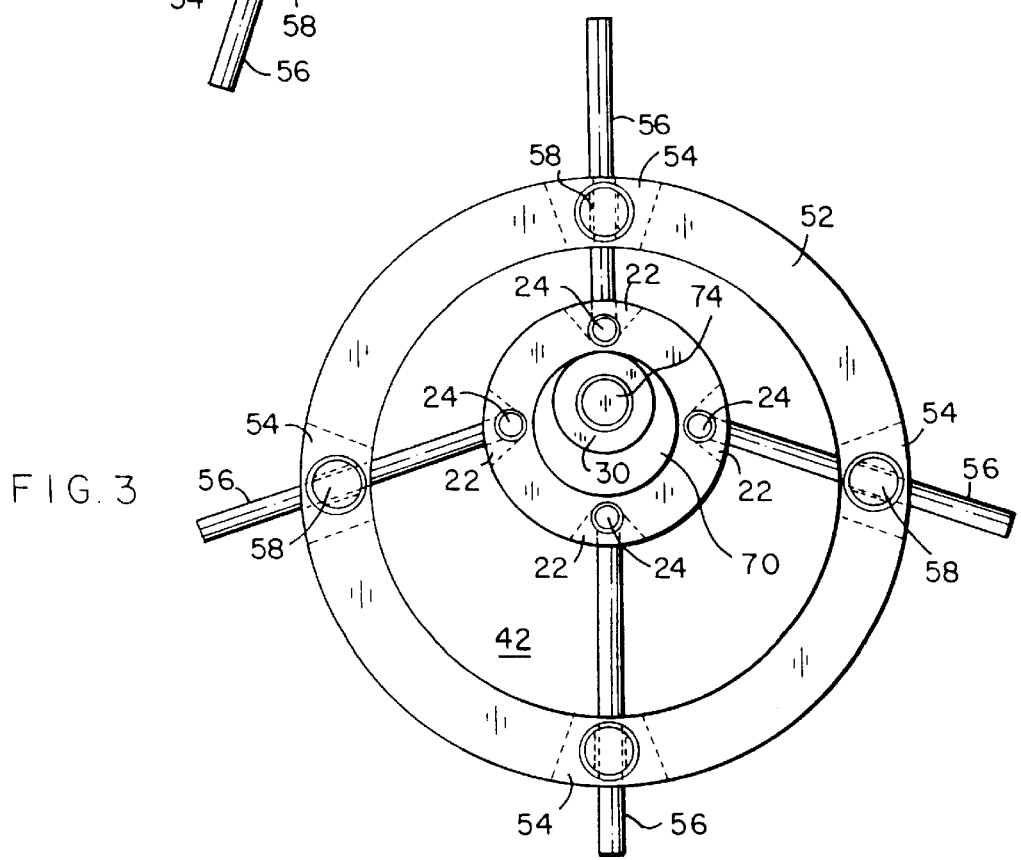
FIG. 3 is a view as in FIG. 2 showing the ring gear at a twelve o'clock position.
Figure 4:
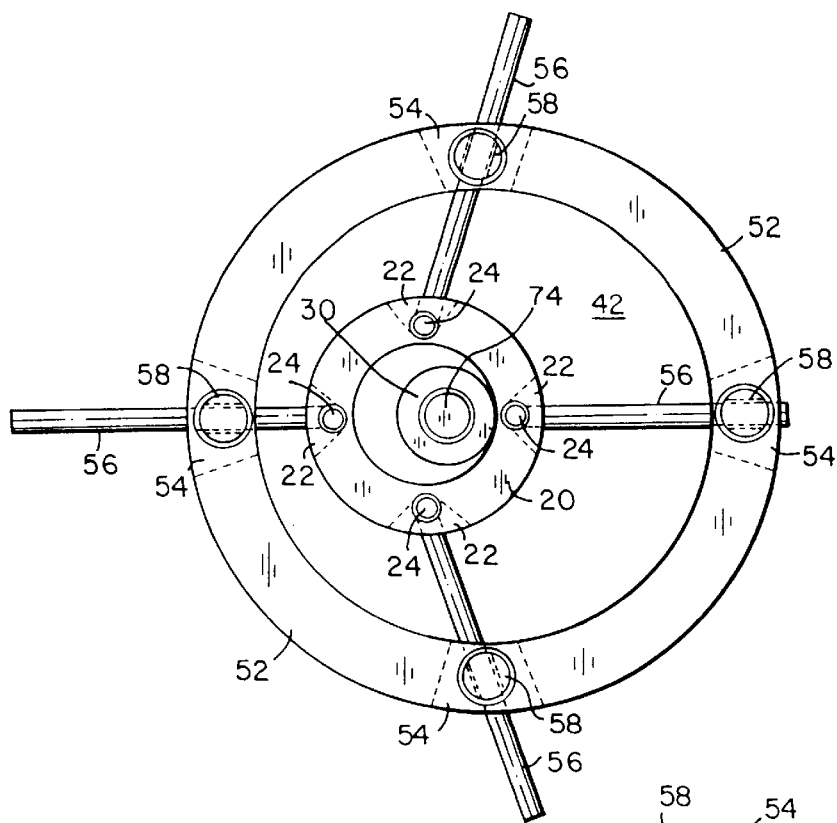
FIG. 4 is a view as in FIG. 3 showing the ring gear at a nine o'clock position.
Figure 5:
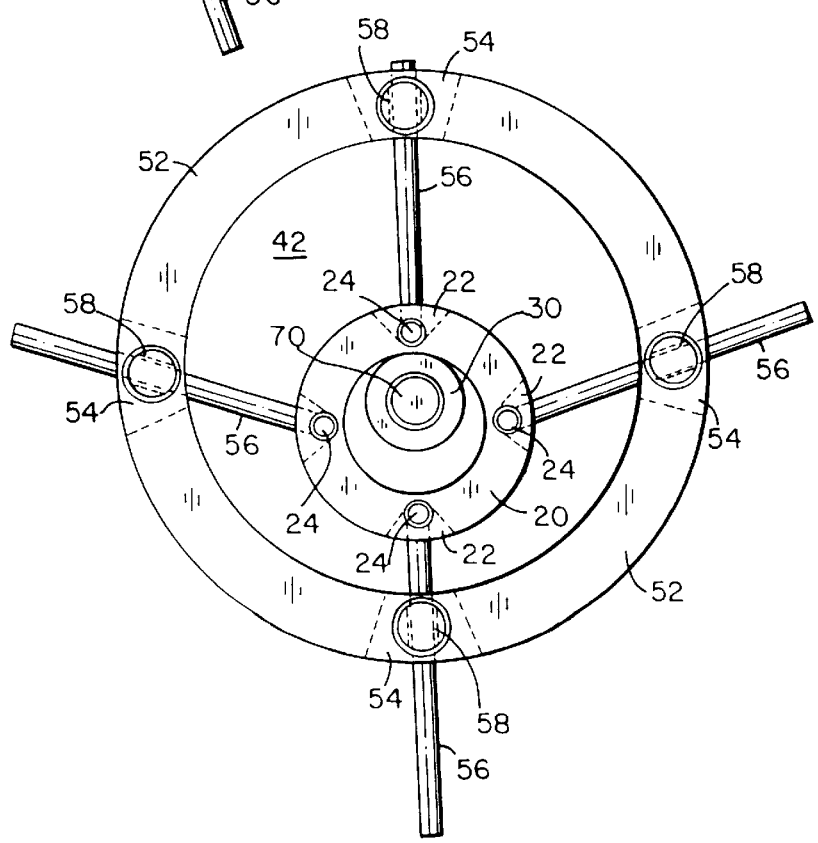
FIG. 5 is a view as in FIG. 4 showing the ring gear at a six o'clock position.
Figure 8:
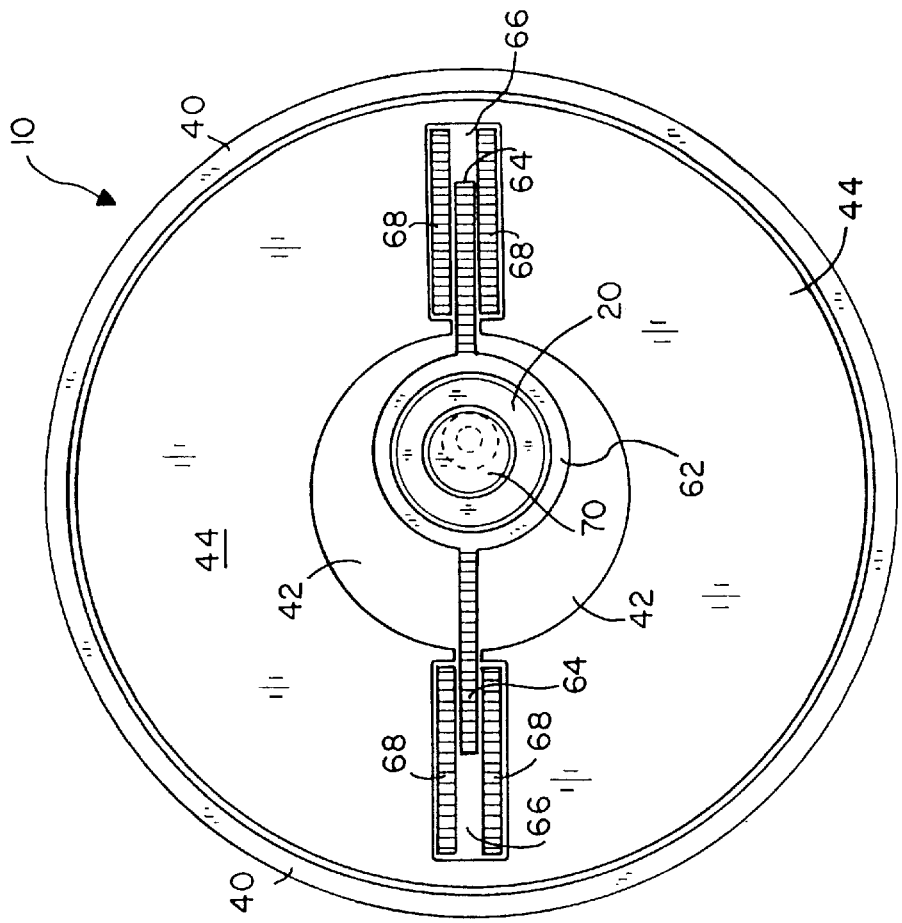
FIG. 8 is a partial cross-sectional front view of the apparatus of FIG. 1 taken along line E–F, showing the input shaft flange and shaft flange rim with the male and female worm gears and ring gear containment ring.
Figure 6:
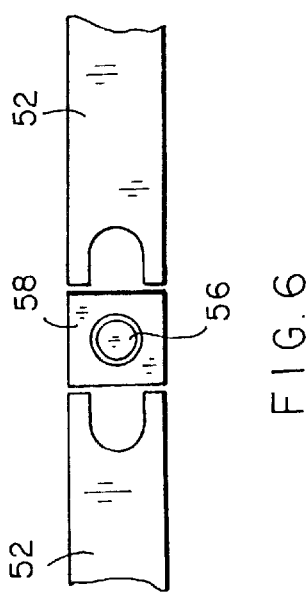
FIG. 6 is a broken-away side section of the annular frame and pivot leg pin.
Figure 7:
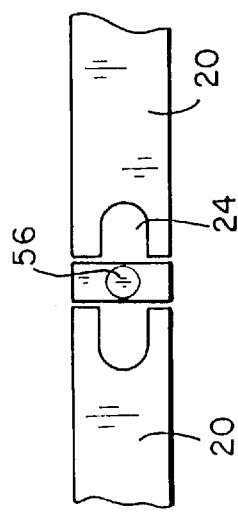
FIG. 7 is a broken-away side section of the ring gear and pivot leg pin.
Figure 9:
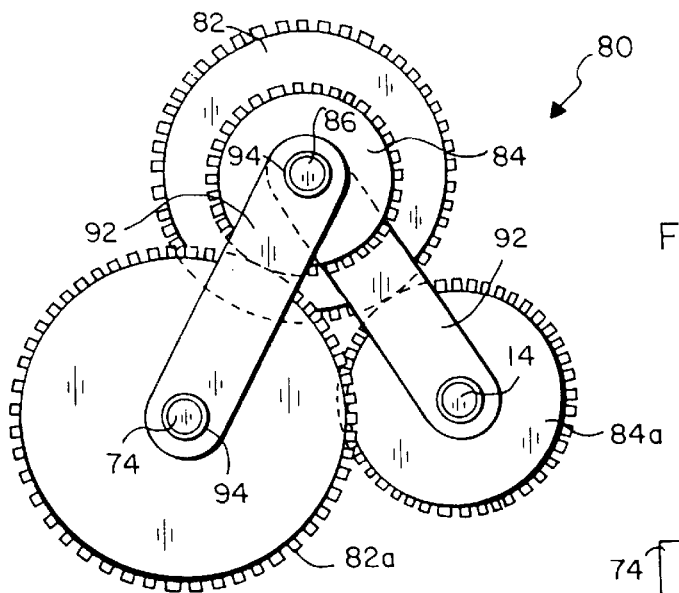
FIGS. 9–14 are alternating top and front views of the gear train in a series of radial extension positions.
Figure 10:
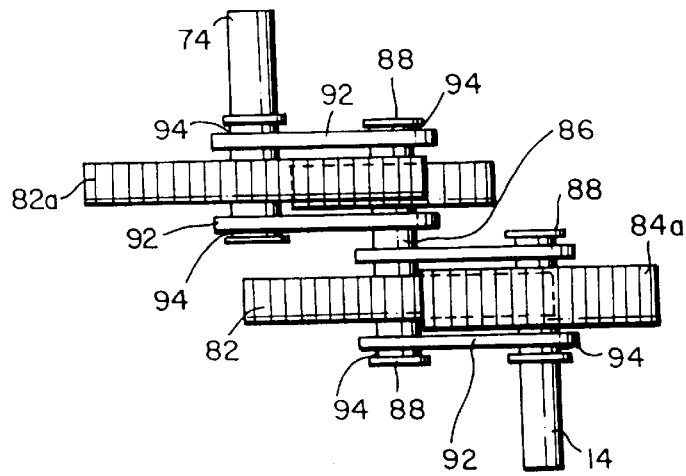
Figure 11:
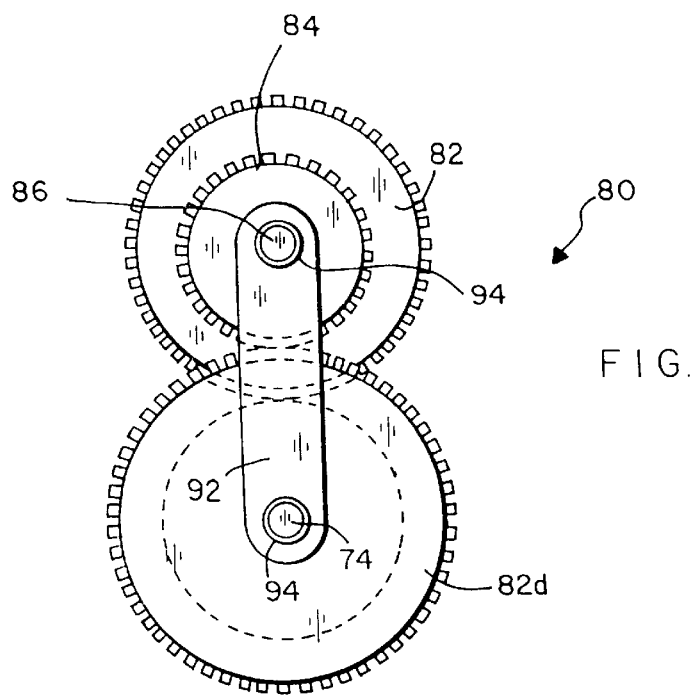
Figure 12:
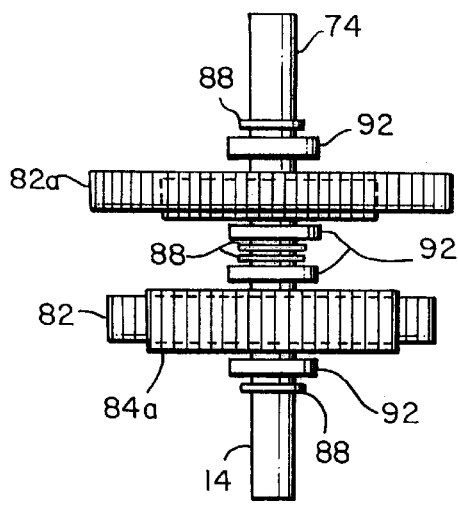
Figure 13:
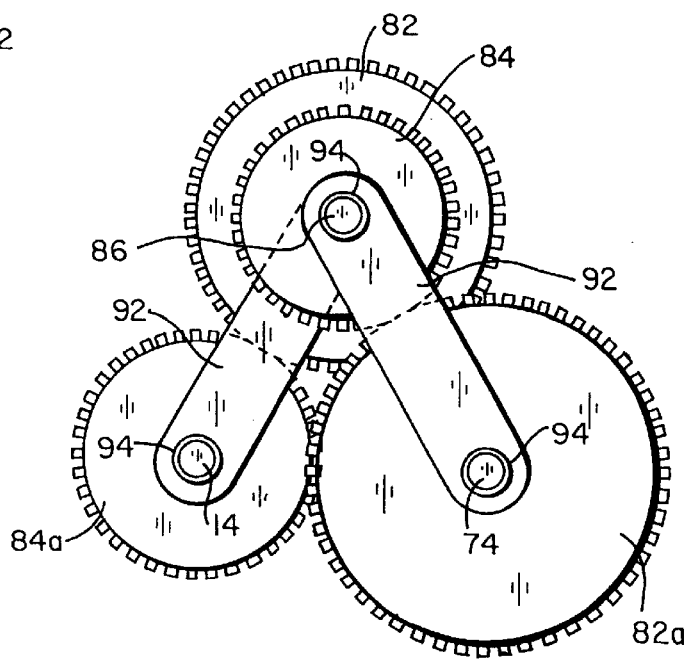
Figure 14:
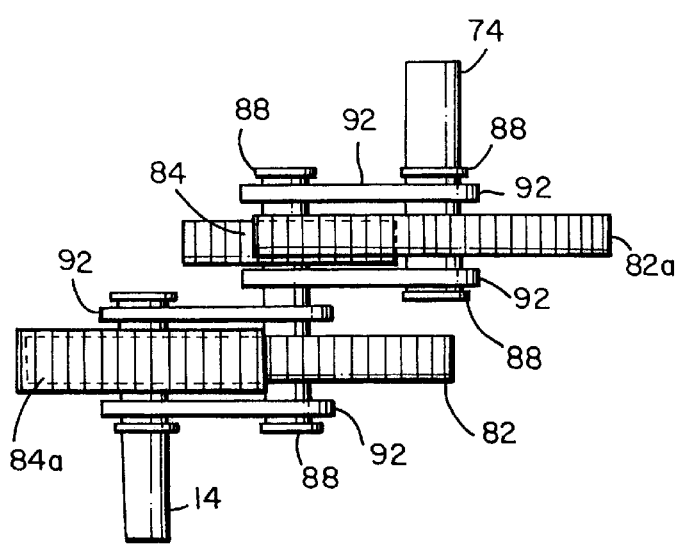

Referring to FIGS. 1–14, a transmission apparatus 10 is disclosed for transmitting rotational energy from an input shaft 12 to an output shaft 14 at continuously variable gear ratios. Apparatus 10 includes a ring gear 20 having internal ring gear 20 teeth and having a central axis B which is constrained with ring gear constraining means to move translationally along a circular path about the input shaft 12 rotational axis A, without rotating about its own central axis B relative to apparatus 10; means for continuously changing the distance between the ring gear 20 central axis B and input shaft 12 rotational axis A; a pinion gear 30 having a diameter smaller than the inner diameter of ring gear 20 and retained with ring gear 20 such that its rotational axis P is parallel with ring gear 20 central axis B and is held in engagement with the ring gear 20 teeth by pinion gear 30 constraining means rotationally connected to apparatus output shaft 14 by gear train means.

Method of Operation

Each time input shaft 12 rotates one revolution, the ring gear 20 constraining means moves ring gear 20 one revolution translationally along the circular path around the input shaft 12 rotational axis A. The distance between the input shaft rotational axis A and the ring gear central axis B, plus the internal radius of ring gear 20, defines the diameter of the circular path over which pinion gear 30 travels during a single input shaft 12 revolution, and thus defines the arched distance over which pinion gear 30 rolls for each input shaft 12 revolution. Therefore altering the distance between the input shaft rotational axis A and the ring gear central axis B alters the distance over which pinion gear 30 rolls for each input shaft 12 revolution and in turn alters the number of output shaft 14 revolutions for each input shaft 12 revolution. Since the distance between the input shaft rotational axis A and the ring gear central axis B can be altered continuously, rather than in a series of discreet steps, the gear ratio between input shaft 12 and output shaft 14 can be altered continuously. For the preferred embodiment, the distance between the input shaft rotational axis A and the ring gear central axis B can be reduced to zero, so that input shaft 12 and output shaft 14 are coaxial, and from there the input shaft rotational axis A can be advanced beyond the ring gear central axis B in the opposite direction from that producing a positive gear ratio so that a continuously variable negative gear ratio is produced. A negative gear ratio means that output shaft 14 rotates in a direction opposite that of input shaft 12. As a result, apparatus 10 can reduce a maximum positive gear ratio continuously to a one-to-one gear ratio and then continuously to a maximum negative gear ratio, while the gears remain in continuous driving contact. There is no need for a clutch to disengage gears to change the ratio.

Apparatus Structure

Apparatus 10 is sealingly contained within an apparatus housing 40 for retaining a suitable, conventional gear lubricant. Input shaft 12 flares within housing 40 into an input shaft flange 42 having a thick region at its circumference forming an input shaft flange rim 44. The input shaft rotational axis A and the output shaft rotational axis C are preferably co-linear.

The ring gear constraining means preferably includes an annular frame 52 having an inner diameter larger than the ring gear 20 outer diameter and containing ring gear 20. Annular frame 52 is fixed within housing 40 against rotation relative to housing 40 by any of several well known fastening means, such as by welding. Annular frame 52 includes several, preferably four, radially opening pivot leg slots 54, and a pivot leg 56 extends through and is pivotally mounted within each leg slot 54 within a frame pivot pin 58. See FIGS. 1 and 6. Ring gear 20 has four equally spaced pivot leg recesses 22, and each pivot leg 56 extends into one of recesses 22, where each is pivotally secured within a ring gear pivot pin 24. See FIG. 7. Pivot legs 56 permit ring gear 20 to move translationally around the center of annular frame 52 along a circular path, and thus around input shaft rotational axis A, but prevent ring gear 20 rotation about its ring gear central axis B.

The means for continuously changing the distance between the ring gear central axis B and the input shaft rotational axis A preferably includes a ring gear containment ring 62 fit closely and slidingly around the input end of ring gear 20. Two diametrically opposed threaded shafts, in the form of male worm gears 64, extend fixedly and radially outward from containment ring 62 into corresponding bores 66 in input shaft flange rim 44. See FIG. 8. The male worm gears 64 are each engagingly contained within female worm gears 68, which in turn are each armatures of electric motors (not shown in full). Delivering electric current to the two electric motors causes both pairs of worm gears 64 and 68 to operate in unison to translationally move containment ring 62, and thus ring gear 20, along a diametric path within annular frame 52, thereby continuously altering the distance between the input shaft rotational axis A and the ring gear central axis B to vary the gear ratio between the input and output shaft.

The pinion gear constraining means preferably includes a smooth raceway 72 within ring gear 20 and a bearing 70 riding within the smooth raceway 72. Pinion gear 30 has centered mounting port and bearing 70 has an output end directed bearing stem 74 on which pinion gear 30 is mounted through the mounting port. Pinion gear 30 is mounted off-center within bearing 70 so that the pinion gear 30 teeth mesh with the ring gear 20 teeth.

The gear train means preferably includes a series of intermeshing double tiered gears 80, made up of a series of larger diameter gears 82 meshing with smaller diameter gears 84. See FIGS. 9–14. As a result of this construction, the gear train is capable of pivoting around itself at each intermeshing large and small gear pair 82 and 84, respectively, so that the gear train rotational input axis and the gear train rotational output axis can be extended away from each other as well as toward each other while transmitting torque and remaining mutually parallel. A larger diameter first gear 82a is formed onto a pinion gear shaft 32 at the output end of pinion gear 30 and a smaller diameter last gear 84a is formed onto the inwardly directed end of output shaft 14. Between first gear 82a and last gear 84a is an intervening series of the double tiered gears 80, each including a gear shaft 86 having a smaller gear 84 at one end and a larger gear 82 at the other end. The shafts 86 of intermeshing larger and smaller gear pairs 82 and 84, respectively, are interconnected by shaft brackets 92 having shaft passing ports 94. Gear shafts 86 of double tiered gears 80 each have knobs 88 at each end and at their middle segments to retain shaft brackets 92 against longitudinal travel along shafts 86. The number of double tiered gears 80 provided between the first gear 82a and last gear 84a depends upon the radial distance between the two and the diametric sizes of the double tiered gears 80. The number of larger and smaller gears 82 and 84, respectively, in the gear train is preferably even so that output shaft 14 rotates in the same direction as the pinion gear shaft 32, and only one intervening double tiered gear 80 happens to be provided for the illustrated preferred embodiment.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A transmission apparatus, comprising:

an input shaft;

an output shaft;

a ring gear having a ring gear inner and outer diameter, wherein said ring gear inner diameter defines a ring gear inner circumference, said ring gear inner circumference lined with internal ring gear teeth, and said ring gear having a ring gear central axis;

ring gear constraining means constraining said ring gear to move translationally along a substantially circular path about said input shaft rotational axis without rotating about its own central axis relative to said apparatus;

means for continuously changing the distance between the ring gear central axis and the input shaft rotational axis;

a pinion gear having a diameter smaller than said inner diameter of said ring gear and retained with said ring gear such that its rotational axis is parallel with said ring gear central axis;

and held in engagement with said ring gear teeth by pinion gear constraining means rotationally and drivably connected to an apparatus output shaft;

wherein each time said input shaft rotates one revolution, the ring gear constraint means moves the ring gear one revolution translationally along the circular path around the input shaft rotational axis, and the distance between said input shaft rotational axis and said ring gear central axis defines the diameter of the circular path over which said pinion gear travels during a single input shaft revolution.

2. The apparatus of claim 1, additional comprising an outer housing containing a gear lubricant.

3. The apparatus of claim 1, wherein said ring gear constraining means comprises:

an annular frame having an inner diameter larger than said ring gear outer diameter and containing said ring gear, said annular frame being fixed within said housing against rotation relative to said housing and having a plurality of radially opening pivot leg slots;

a plurality of pivot legs, each said pivot leg extending through and pivotally mounted within of said pivot leg slots and extending to and being pivotally secured to the outer surface of said ring gear;

wherein said pivot legs permit said ring gear to move translationally around the center of said annular frame along a substantially circular path and prevent rotation of said ring gear about the central axis of said ring gear.

4. The apparatus of claim 2, wherein said input shaft flares radially outward within said housing into an input shaft flange having a thick region at its circumference forming an input shaft flange rim.

5. The apparatus of claim 4, wherein said means for continuously changing the distance between said ring gear central axis and said input shaft rotational axis comprises:

a ring gear containment ring fit closely and slidingly around said ring gear;

at least one male worm gear extending radially outward from said containment ring into a corresponding bore in said input shaft flange rim;

at least one female worm gear engagingly containing said at least one male worm gear;

means for rotating said female worm gear relative to said male worm gear; thereby translationally moving said containment ring and said ring gear along a diametric path within said annular frame and continuously altering the distance between said input shaft rotational axis and said output shaft rotational axis to vary said rotation ratio.

6. The apparatus of claim 1, wherein said pinion gear constraining means comprises:

a raceway within said ring gear;

and a bearing riding within the smooth ring gear segment, said pinion gear being mounted off-center to said bearing such that teeth of said pinion gear mesh with teeth of said ring gear.

7. The apparatus of claim 1, additionally comprising gear train means rotationally and drivably connecting said pinion gear to said output shaft; wherein said gear train means comprises:

a pinion gear shaft extending coaxially from said pinion gear;

a larger diameter first gear formed onto said pinion gear shaft;

a smaller diameter last gear formed onto said output shaft;

and at least one intervening double tiered gear drivably connecting said first gear and said last gear, said at least one double tiered gear comprising a gear shaft having a small gear at one gear shaft end and a larger gear at the other gear shaft end, said gear shaft;

wherein said gear train means is capable of pivoting around itself to at each pair of intermeshing gears such that said input axis and rotational output axis can be extended away from each other and toward each other while remaining mutually parallel.

* * * * *